Patented July 20, 1948

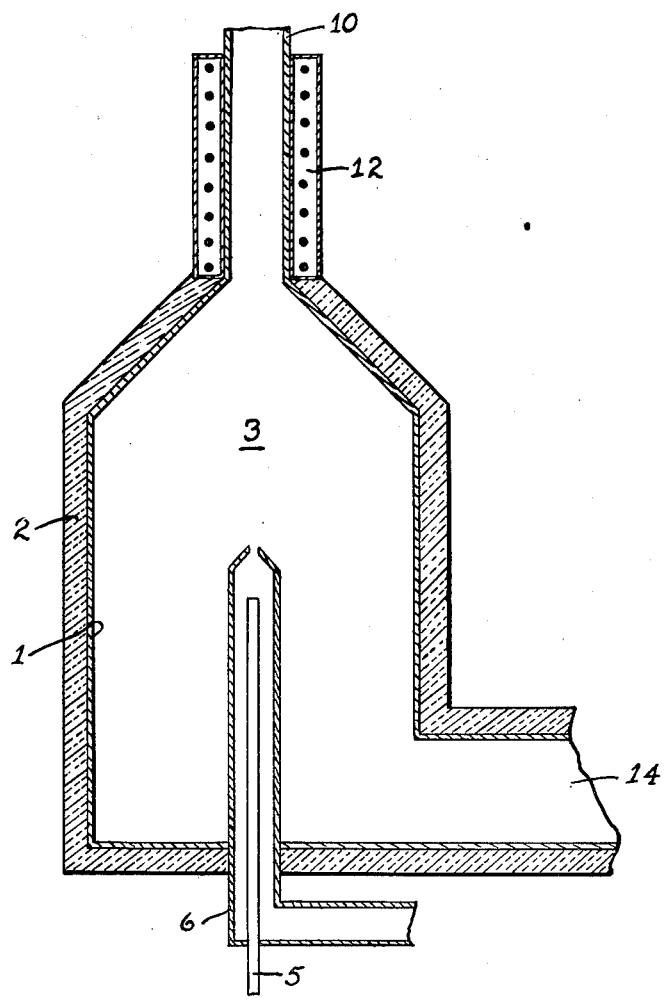

2,445,691

UNITED STATES PATENT OFFICE 2,445,691

PREPARATION OF TITANIUM DIOXIDE

Alphonse Pechukas, Akron, Ohio, assignor to Pittsburgh Plate Glass Company, Allegheny County, Pa., a corporation of Pennsylvania Application May 24, 1944, Serial No. 537,153

1 Claim. (Cl. 23—202)

The present invention relates to the production of pigmentary materials and more particularly to a method of preparing finely-divided titanium dioxide by the reaction of oxygen with vaporized titanium tetrachloride, while minimizing crystal formation by conducting the reaction out of substantial contact with hot surfaces.

One object of my invention is to provide a method of producing finely-divided titanium dioxide wherein oxygen or air is admixed with vaporized titanium tetrachloride prior to the introduction thereof into a reaction chamber.

A further object of the invention is the provision of a process of producing finely-divided titanium dioxide wherein a gaseous mixture of oxygen and titanium tetrachloride is introduced into a reaction chamber and is subsequently brought to reaction temperature while being maintained substantially out of contact with hot surfaces.

Other objects and advantages of the invention will be apparent from the following detailed description of certain preferred embodiments thereof.

The reaction between oxygen and titanium tetrachloride at elevated temperatures to produce titanium dioxide has been the subject of considerable investigation. It is, of course, quite evident that the direct production of titanium dioxide in this manner is more economical than those processes involving hydrolytic splitting of titanium tetrachloride.

The first experiments, wherein titanium tetrachloride was reacted with oxygen, produced titanium dioxide of a crystalline form which had to be comminuted before it could be used as a pigment. U. S. Patents No. 2,240,343, issued April 29, 1941, and No. 2,340,610, issued February 1, 1944, pointed out that crystalline titanium dioxide resulted when the oxidation of titanium tetrachloride occurred adjacent the hot surfaces of the reaction chamber. Several methods of avoiding crystal formation are described and claimed in said patents.

The present invention contemplates an improvement over the known processes hereinbefore mentioned, in that a more finely-divided pigment with improved properties is obtained. In the process of the invention, oxygen or air is admixed with vaporized titanium tetrachloride to form a gaseous mixture having a temperature below about 400° C. to avoid preliminary reaction therebetween, and the gaseous mixture is injected into a reaction chamber into contact with a stream of oxygen or air preheated to a temperature sufficient to increase the temperature of the reaction mixture to that point at which oxidation of the titanium tetrachloride will be effected in the central portion of the reaction chamber.

The accompanying drawing is a vertical sectional view of apparatus which is suitable for use in accordance with my invention.

Referring to the drawing, a vertical furnace 1, protected by a shell 2 of insulating material defines a reaction chamber 3. Extending through the base of the furnace 1 and approaching the reaction chamber 3 are concentrically arranged tubes 5 and 6. Tube 5 serves as a conduit for titanium tetrachloride vapors generated from a convenient supply thereof or emanating directly from a furnace wherein titanium ores are chlorinated. Oxygen or air, at room temperature, is forced through tube 6 by suitable means (not shown) and mixed with the titanium tetrachloride at the tip of tube 5. The end of tube 6 is partially closed to form a nozzle through which the gaseous mixture of oxygen or air and titanium tetrachloride is injected into the reaction chamber 3.

A conduit 10, surrounded by an induction heater 12, or other suitable heating means, is provided at the upper end of the furnace 1 for the introduction of oxygen or air into the reaction chamber 3. The furnace 1 also has an outlet 14 through which the reaction products are withdrawn and conveyed to a suitable separation chamber (not shown).

In the operation of this apparatus, a mixture of oxygen or air and vaporized titanium tetrachloride is injected into the reaction chamber 3 and at the same time a stream of oxygen or air preheated to a temperature at which it will react with titanium tetrachloride is injected into the reaction chamber 3 through conduit 10 and into contact with the gaseous mixture. The rates of introduction of the two streams of reactants are so regulated that the point of contact and the resultant reaction zone will be established at a point remote from the walls of the furnace. The countercurrent streams of reactants merge, whereupon the tetrachloride is oxidized to form titanium dioxide, chloride also being generated and the reaction products are withdrawn from the furnace. The oxygen or air supplied through tube 6 maintains the inlet tubes and gaseous mixture at a temperature below about 400° C. so that there will be no oxidation of the titanium tetrachloride at its point of entry into the furnace, thus avoiding possible crystal formation and growth at this point.

While the temperature at which the oxidation of titanium tetrachloride is effected may be varied considerably, it is preferred to maintain a temperature of approximately 1000° C. in the reaction zone of the reaction chamber in order to obtain optimum operating conditions. The temperature of reaction may be readily controlled by regulation of the temperature of the preheated oxygen or air entering the furnace.

The following example is illustrative of my process:

Example

Using an apparatus having the general structure as shown in the accompanying drawing, vaporized titanium tetrachloride admixed with approximately 25% by weight of air at a temperature of approximately 385° C. was introduced at a rate of 33.6 liters per minute into a reaction chamber having an internal diameter of 14 inches. A countercurrent stream of air, preheated to a temperature of 1200° C. was introduced into the furnace at the rate of 130 liters per minute. The temperature within the chamber was thus maintained at 1000° C. throughout the reaction. There was obtained a yield of 96% of pigmentary titanium dioxide, containing substantially no crystals. At the end of the run, the furnace was inspected and it was found to be free of any crystal growths or buds, proving the reaction to have taken place substantially out of contact with the walls of the furnace.

Although the process has been described in connection with the production of titanium dioxide it is not so limited but may be applied to the oxidation of other metallic halides, which will react with oxygen, as well as to oxidation of titanium tetrachloride admixed with other metallic halides incident to the production of mixed pigments.

It will at once be obvious that various modifications in the procedural details and manipulative steps are possible without departing from the spirit of the invention or the scope of the appended claim. The present application is a continuation-in-part of my copending application Serial No. 509,703, filed November 10, 1943, now Patent No. 2,437,171.

What I claim is:

A method of preparing titanium tetrachloride which comprises introducing a stream of air and titanium tetrachloride vapor into a reaction chamber through an inlet conduit extending into a central space of the chamber; the temperature of said stream being below about 400° C. introducing a second stream of air preheated to a temperature of at least 1000° C. into another portion of the reactor spaced from the inlet, said second stream being directed toward the inlet and in a direction countercurrent to the first stream and regulating the relative velocities of the two streams to maintain their point of contact in a central area in the reaction chamber and spaced from the inlet and walls thereof.

ALPHONSE PECHUKAS.

REFERENCES CITED

The following references are of record in the file of this patent:

UNITED STATES PATENTS

| Number | Name | Date |
|---|---|---|
| 1,451,399 | Low | Apr. 10, 1923 |
| 1,931,381 | Haber et al. | Oct. 17, 1933 |
| 2,340,610 | Muskat et al. | Feb. 1, 1944 |

FOREIGN PATENTS

| Number | Country | Date |
|---|---|---|
| 358,492 | Great Britain | Oct. 7, 1931 |